(12) United States Patent
Numanoi

(10) Patent No.: US 7,702,962 B2
(45) Date of Patent: Apr. 20, 2010

(54) STORAGE SYSTEM AND A METHOD FOR DISSOLVING FAULT OF A STORAGE SYSTEM

(75) Inventor: Tadashi Numanoi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 981 days.

(21) Appl. No.: 10/912,410

(22) Filed: Aug. 4, 2004

(65) Prior Publication Data
US 2005/0262386 A1 Nov. 24, 2005

(30) Foreign Application Priority Data
Apr. 21, 2004 (JP) ............................. 2004-125622

(51) Int. Cl.
 *G06F 11/00* (2006.01)
 *G06F 11/26* (2006.01)
(52) U.S. Cl. ............................. 714/43; 714/26; 714/42; 703/13; 703/14
(58) Field of Classification Search ............... 714/9, 714/26, 4, 43, 42; 703/13, 14
See application file for complete search history.

(56) References Cited

U.S. PATENT DOCUMENTS

| | | | | |
|---|---|---|---|---|
| 5,117,494 A | * | 5/1992 | Costes et al. ................... 714/4 |
| 5,978,576 A | * | 11/1999 | Sanadidi et al. ............... 703/22 |
| 6,378,039 B1 | | 4/2002 | Obara et al. | |
| 6,546,531 B1 | * | 4/2003 | Quach et al. ................... 716/6 |
| 6,625,747 B1 | * | 9/2003 | Tawil et al. ................... 714/6 |
| 6,658,504 B1 | * | 12/2003 | Lieber et al. ................. 710/52 |
| 6,697,367 B1 | | 2/2004 | Halstead et al. | |
| 6,779,078 B2 | | 8/2004 | Murotani et al. | |

(Continued)

FOREIGN PATENT DOCUMENTS

JP 08-309814 A 11/1996

(Continued)

OTHER PUBLICATIONS

Wikipedia's Logical Volumen Management revision from Jan. 22, 2004 http://en.wikipedia.org/w/index.php?title=Logical_volume_management&oldid=4681813.*

(Continued)

*Primary Examiner*—Scott T Baderman
*Assistant Examiner*—Joseph Schell
(74) *Attorney, Agent, or Firm*—Townsend and Townsend and Crew LLP

(57) ABSTRACT

The present invention detects the occurrence of a bottleneck on the basis of the states of respective elements of the storage system and presents a measure for eliminating the bottleneck before actually changing the constitution of the storage system. The host element N1 is connected to the element N10 in the storage device via the elements N3, N6 and N8 (S1). Element N1 is a device file or the like, for example. Element N10 is a logical volume or the like, for example. When a bottleneck occurs in the intermediate element N8 (S2), the bottleneck is detected (S4) on the basis of collected information on the respective elements of the storage system (S3). A measure that is effective in eliminating the bottleneck is then reviewed and selected (S5, S6). This measure manipulates any of the elements N1 and N2 or N9 and N10 located at the two ends of the path.

8 Claims, 17 Drawing Sheets

U.S. PATENT DOCUMENTS

| | | | | |
|---|---|---|---|---|
| 6,874,100 B2 * | 3/2005 | Rauscher | ........................ | 714/6 |
| 6,912,635 B2 | 6/2005 | Patterson et al. | | |
| 7,082,390 B2 * | 7/2006 | Bergsten | ........................ | 703/21 |
| 7,111,084 B2 * | 9/2006 | Tan et al. | ........................ | 710/15 |
| 7,139,676 B2 * | 11/2006 | Barford | ........................ | 702/183 |
| 7,149,919 B2 * | 12/2006 | Cochran et al. | ................ | 714/4 |
| 7,356,452 B1 * | 4/2008 | Naamad et al. | ................ | 703/22 |
| 7,567,886 B2 * | 7/2009 | Beeston et al. | ............. | 702/182 |
| 2001/0050915 A1 | 12/2001 | O'Hare et al. | | |
| 2003/0093619 A1 | 5/2003 | Sugino et al. | | |
| 2004/0059966 A1 * | 3/2004 | Chan et al. | .................... | 714/48 |
| 2004/0267980 A1 | 12/2004 | McBrearty et al. | | |
| 2005/0251702 A1 * | 11/2005 | Baccelli et al. | ................ | 714/4 |

FOREIGN PATENT DOCUMENTS

| | | |
|---|---|---|
| JP | 10-320126 | 12/1998 |
| JP | 2002-373103 A | 12/2002 |
| JP | 2003-152721 A | 5/2003 |
| JP | 2003-256367 A | 9/2003 |
| JP | 2003-296039 A | 10/2003 |
| JP | 2003-296154 A | 10/2003 |
| JP | 2003-316522 A | 11/2003 |
| JP | 2004-013215 A | 1/2004 |
| JP | 2004-503956 A | 2/2004 |

OTHER PUBLICATIONS

Wikipedia's System Administrator revision from Feb. 28, 2004 http://en.wikipedia.org/w/index.php?title=System_adminstrator&oldid=3353139.*

Wikipedia's Expert System revision from Apr. 13, 2004 http://en.wikipedia.org/w/index.php?title=Expert_system&oldid=3289923.*

Japan Patent Office (JPO) office action for JPO patent application JP2004-125622 (Jan. 26, 2010)).

* cited by examiner

HOST PERFORMANCE INFORMATION — T1

| HOST NAME | DEVICE FILE NAME | TIME | I/O VOLUME |
|---|---|---|---|
| H1 | /dev/dsk/xxx | 10:00 | 5000(byte/sec) |
| H1 | /dev/dsk/xxx | 10:10 | 6000(byte/sec) |
| H1 | /dev/dsk/yyy | 10:00 | 1000(byte/sec) |
| H1 | /dev/dsk/yyy | 10:10 | 1000(byte/sec) |
| ⋮ | ⋮ | ⋮ | ⋮ |

FIG. 5A

SWITCH PERFORMANCE INFORMATION — T2

| SWITCH NAME | PORT NAME | TIME | I/O VOLUME |
|---|---|---|---|
| SW-A | A1 | 10:00 | 6000(byte/sec) |
| SW-A | A1 | 10:10 | 7000(byte/sec) |
| SW-A | A2 | 10:00 | 6000(byte/sec) |
| SW-A | A2 | 10:10 | 7000(byte/sec) |
| ⋮ | ⋮ | ⋮ | ⋮ |

FIG. 5B

| STORAGE PORT PERFORMANCE INFORMATION | | | |
|---|---|---|---|
| STORAGE DEVICE NAME | PORT NAME | TIME | I/O VOLUME |
| SS1 | CL0-A | 10:00 | 6000(byte/sec) |
| SS1 | CL0-A | 10:10 | 7000(byte/sec) |
| ⋮ | ⋮ | ⋮ | ⋮ |

FIG. 6A

| PARITY GROUP PERFORMANCE INFORMATION | | | |
|---|---|---|---|
| STORAGE DEVICE NAME | PARITY GROUP NAME | TIME | I/O VOLUME |
| SS1 | 1-1 | 10:00 | 6000(byte/sec) |
| SS1 | 1-1 | 10:10 | 7000(byte/sec) |
| SS1 | 1-2 | 10:00 | 0(byte/sec) |
| SS1 | 1-2 | 10:10 | 0(byte/sec) |
| ⋮ | ⋮ | ⋮ | ⋮ |

FIG. 6B

| LDEV PERFORMANCE INFORMATION | | | | T5 |
|---|---|---|---|
| STORAGE DEVICE NAME | LDEV NAME | TIME | I/O VOLUME |
| SS1 | 0:10 | 10:00 | 5000(byte/sec) |
| SS1 | 0:10 | 10:10 | 6000(byte/sec) |
| SS1 | 0:20 | 10:00 | 1000(byte/sec) |
| SS1 | 0:20 | 10:10 | 1000(byte/sec) |
| SS1 | 1:10 | 10:00 | 0(byte/sec) |
| SS1 | 1:10 | 10:10 | 0(byte/sec) |
| ⋮ | ⋮ | ⋮ | ⋮ |

FIG. 7

PATH INFORMATION T6

| HOST NAME | DEVICE FILE NAME | SW PORT NAME (SENDING) | SW PORT NAME (RECEIVING) | STORAGE DEVICE NAME | PARITY GROUP NAME | PORT NAME | LDEV NAME |
|---|---|---|---|---|---|---|---|
| H1 | /dev/dsk/xxx | A1 | A2 | SS1 | 1-1 | CL0-A | 0:10 |
| H1 | /dev/dsk/xxx | A2 | B1 | SS1 | 1-1 | CL0-A | 0:10 |
| H1 | /dev/dsk/yyy | B1 | B2 | SS1 | 1-1 | CL0-A | 0:10 |
| H1 | /dev/dsk/yyy | A1 | A2 | SS1 | 1-1 | CL0-A | 0:20 |
| H1 | /dev/dsk/yyy | A2 | B1 | SS1 | 1-1 | CL0-A | 0:20 |
| H1 | /dev/dsk/yyy | B1 | B2 | SS1 | 1-1 | CL0-A | 0:20 |
| ... | ... | ... | ... | ... | ... | ... | ... |
| H2 | /dev/dsk/zzz | C1 | C2 | SS1 | 1-2 | CL1-A | 1:10 |
| ... | ... | ... | ... | ... | ... | ... | ... |

FIG. 8

| MEASURE INFORMATION ||||
|---|---|---|---|
| ITEM NUMBER | NAME OF MEASURE | RANGE OF INFLUENCE | PRIORITY LEVEL |
| 1 | CHANGE TO LDEV USING DATA | SWITCH PORT STORAGE PORT PARITY GROUP LDEV | 1 |
| 2 | MOVE DATA TO ANOTHER HOST | DEVICE FILE SWITCH PORT STORAGE PORT PARITY GROUP LDEV | 2 |
| 3 | CHANGE LDEV TO ANOTHER PARITY GROUP | SWITCH PORT STORAGE PORT PARITY GROUP LDEV | 3 |
| ⋮ | ⋮ | ⋮ | ⋮ |

| HOST THRESHOLD VALUE INFORMATION | | |
|---|---|---|
| HOST NAME | DEVICE FILE NAME | THRESHOLD VALUE |
| H1 | /dev/dsk/xxx | Th1 |
| H1 | /dev/dsk/yyy | Th2 |
| ⋮ | ⋮ | ⋮ |

| SWITCH THRESHOLD VALUE INFORMATION | | |
|---|---|---|
| SWITCH NAME | PORT NAME | THRESHOLD VALUE |
| SW-A | A1 | Th3 |
| SW-A | A2 | Th4 |
| ⋮ | ⋮ | ⋮ |

| STORAGE PORT THRESHOLD VALUE INFORMATION | | |
|---|---|---|
| STORAGE DEVICE NAME | PORT NAME | THRESHOLD VALUE |
| SS1 | CL0-A | Th5 |
| SS1 | CL1-A | Th6 |
| ⋮ | ⋮ | ⋮ |

| PARITY GROUP THRESHOLD VALUE INFORMATION | | |
|---|---|---|
| STORAGE DEVICE NAME | PARITY GROUP NAME | THRESHOLD VALUE |
| SS1 | 1-1 | Th7 |
| SS1 | 1-2 | Th8 |
| ⋮ | ⋮ | ⋮ |

| LDEV THRESHOLD VALUE INFORMATION | | |
|---|---|---|
| STORAGE DEVICE NAME | LDEV NAME | THRESHOLD VALUE |
| SS1 | 0:10 | Th9 |
| SS1 | 0:20 | Th10 |
| SS1 | 1:10 | Th11 |
| SS1 | 1:20 | Th12 |
| ⋮ | ⋮ | ⋮ |

| LDEV PERFORMANCE INFORMATION | | | |
|---|---|---|---|
| STORAGE DEVICE NAME | LDEV NAME | TIME | I/O VOLUME |
| SS1 | 0:10 | 10:00 | 5000(byte/sec) |
| SS1 | 0:10 | 10:10 | 0(byte/sec) ⇐ |
| SS1 | 0:20 | 10:00 | 1000(byte/sec) |
| SS1 | 0:20 | 10:10 | 1000(byte/sec) |
| SS1 | 1:10 | 10:00 | 0(byte/sec) |
| SS1 | 1:10 | 10:10 | 0(byte/sec) |
| ⋮ | ⋮ | ⋮ | ⋮ |

| LDEV PERFORMANCE INFORMATION | | | |
|---|---|---|---|
| STORAGE DEVICE NAME | LDEV NAME | TIME | I/O VOLUME |
| SS1 | 0:10 | 10:00 | 5000(byte/sec) |
| SS1 | 0:10 | 10:10 | 0(byte/sec) ⇐ |
| SS1 | 0:20 | 10:00 | 1000(byte/sec) |
| SS1 | 0:20 | 10:10 | 7000(byte/sec) ⇐ |
| SS1 | 1:10 | 10:00 | 0(byte/sec) |
| SS1 | 1:10 | 10:10 | 0(byte/sec) |
| ⋮ | ⋮ | ⋮ | ⋮ |

FIG. 17B

STORAGE SYSTEM AND A METHOD FOR DISSOLVING FAULT OF A STORAGE SYSTEM

CROSS-REFERENCE TO RELATED APPLICATIONS

This application relates to and claims priority from Japanese Patent Application No. 2004-125622 filed on Apr. 21, 2004, the entire disclosure of which is incorporated herein by reference.

BACKGROUND OF THE INVENTION

The present invention relates to a storage system and obstacle elimination method for the storage system.

A storage system comprises one or more storage devices that are used by a plurality of host computers (servers or similar), for example. Respective host computers and storage devices are connected via a relay device such as a fiber channel switch, hub, or the like.

A storage device can also be called a disk array device or the like, for example, and is constituted by arranging a multiplicity of disk drives in the form of an array. Storage devices provide a RAID (Redundant Array of Independent Inexpensive Disks)-based storage area, for example. A logical volume (logical device), which is a logical storage area, is formed on a physical storage area that each disk drive comprises. Further, a host computer such as a server issues write commands or read commands of a predetermined format to the storage device, whereby the reading/writing of the desired data can be executed.

Each host computer accesses an allocated logical volume via a predetermined path to read/write data. The system administrator or similar is able to allocate the logical volume by considering the load uniformity distribution. A technology that allocates the lowest-load logical volume to the host computer that has been newly added to the storage system is also known (Japanese Patent KOKAO Publication No. H10-320126).

A technology is also known according to which a plurality of communication paths is set beforehand, and, when a power supply fault or similar occurs, data is transferred via a bypass (Patent KOHYO Publication No. 2004-503956).

SUMMARY OF THE INVENTION

The former patent document (Japanese Patent KOKAO Publication No. H10-320126) seeks to implement optimal allocation of logical volumes through detection of the load states of the respective logical volumes. However, this does not mean that the storage system is constituted by storage devices alone. The storage system is constituted instead by a plurality of types of element such as a plurality of host computers and fiber channel switches. The former conventional technology is unable to take the load states of other elements other than-the storage device into consideration and is not capable of performing load diffusion or the like on the basis of the status of the whole storage system.

The latter patent document discloses only the transfer of data via a bypass when the communication path is down, and is unable to consider the load status of the whole storage system.

The storage system is a complex system constituted by a plurality of types of element such as host computers, fiber channel switches, and storage devices, for example, in which the load state of the whole system fluctuates in accordance with the usage state at any given time. In cases where load ubiquity occurs within the storage system and this is an obstacle to the operation, the storage administrator adds a disk on the basis of his or her own experience and changes the logical-volume allocation. However, there is no guarantee that the change in constitution will be effective in eliminating the ubiquity of the load. Moreover, the load status of a storage system that requires continuous operation 24 hours, 365 days a year varies from one hour to the next and it is therefore difficult to adapt suitably and rapidly to irregular changes in status at this frequency.

Accordingly, it is an object of the present invention to provide a storage system and obstacle elimination method for the storage system that allow measures for eliminating obstacles which may hinder performance improvement by considering the performance status of each element constituting the storage system, before a change to the constitution is actually performed. An object of the present invention is to provide a storage system and obstacle elimination method for the storage system that, while considering the status of elements located midway between the host computers and storage devices, are capable of eliminating an obstacle by changing the constitution of the host computer and storage device that are located at the two ends of the communication path without directly changing the constitution of the intermediate elements. Additional objects of the present invention will become evident from the subsequent description of the embodiment.

In order to resolve the above problems, the storage system of the present invention comprises a storage device with a plurality of logical volumes, a host computer that is connected to the storage device and that has an access processing unit for accessing each of the logical volumes, and a management computer connected to the storage device and the host computer. In addition, the present invention comprises a performance information collection unit for collecting performance information on the performance of respective elements on a communication path extending from the host computer to the storage device; a faulty element detection unit for detecting a faulty element with an obstacle that hinders performance improvement on the basis of the collected performance information on the respective elements; and a reviewing unit for reviewing measures based on the nature of the obstacle of the faulty element thus detected and selecting a measure that is effective against the obstacle, wherein measures reviewed by the reviewing unit change at least either one of the logical volume and the access processing unit associated with the faulty element to another logical volume or another access processing unit.

Here, 'access processing unit' denotes a function or structure for processing a data access request from an application program installed on the host computer, for example, possible examples that may be cited including file systems and device files. Examples that may be cited for 'respective elements on the communication path' include a logical volume, an access processing unit, and a relay device such as a switch or hub. The 'host computer' is a computer such as a server, mainframe, or the like, for example, which performs data processing in accordance with a request from a client terminal, for example. The 'management computer' is a computer for managing a storage system. Although the host computer and management computer can be distinguished in terms of function, the constitution may be such that an application server and management server are physically combined within the same computer, for example.

'Performance information' denotes information on the performance of each element such as the responsiveness thereof, for example, and can include the I/O volume (input/output requested volume) per unit of time, for example. 'Obstacle hindering performance improvement' denotes an event in which the performance of respective elements is reduced. For example, in cases where the responsiveness drops due to a load concentration on a specific element, the load concentration constitutes an 'obstacle hindering performance improvement'.

The storage system can also comprise a presentation unit for presenting the measure selected by the reviewing unit to a user. The presentation unit can present the measure selected by the reviewing unit to the user via a user interface such as a terminal screen or voice synthesizer, for example. A system administrator or other user can then judge whether to adopt the measure thus presented. When the presented measure is adopted, the user changes the constitution of the storage system via the management computer and so forth.

The reviewing unit is capable of selecting a measure that is effective against the obstacle by evaluating the efficacy against the obstacle of all or some of a plurality of pre-prepared measures. For example, a plurality of measures, such as a first measure, second measure, and third measure, are pre-prepared, and the efficacy of all or some of the plurality of measures with respect to the obstacle can be evaluated. Each measure can include a plurality of submeasures. Further, the reviewing unit is capable of selecting the most effective measure, for example. Alternatively, the reviewing unit is also able to compare the results of obstacle improvement and the various costs required for the obstacle improvement, and select the measure that is superior in terms of cost versus effect.

A storage unit for pre-storing a plurality of measures each with a different priority level is provided, and, in order of priority starting with the measure with the highest priority among the plurality of measures, the reviewing unit is also able capable of evaluating the efficacy of the measures against the obstacle and of selecting the measure that is effective against the obstacle when such a measure is found.

For example, in cases where higher priority levels are established in ascending order for the first measure, second measure, and third measure respectively, the reviewing unit evaluates efficacy in order starting with the first measure. When an effective measure is then found, the reviewing unit does not execute the evaluation for the remaining measures and selects the measure that is first judged to be effective. For example, when the first measure with the highest priority level has predetermined efficacy, the reviewing unit does not perform the efficacy evaluation for the second and third measures, and selects the first measure. An effective measure for the obstacle can therefore be selected quickly.

The range of elements affected by a plurality of measures each with a different priority level is associated beforehand with each of the measures, and, in order of priority starting with the measure with the highest priority level among the plurality of measures, the reviewing unit is also capable of evaluating the efficacy of the measures against the obstacle within the range of the elements pre-associated with the measures and selecting the measure that is effective against the obstacle when such a measure is found.

The range of influence when a measure is implemented sometimes varies depending on the type of measure. There are cases where one certain measure affects elements within a specified range, while one other measure affects the element within another range. That is, there are cases where one certain measure is effective for one or a plurality of elements, while one other measure is effective for one other element or a plurality of other elements. In such a case, the reviewing unit evaluates the efficacy of each measure to an obstacle in the range where the measure is effective. Accordingly, efficacy can be efficiently evaluated by preventing worthless evaluations of efficacy.

A method for eliminating obstacles of a storage system according to another aspect of the present invention is a method for eliminating obstacles of a storage system having a storage device with a plurality of logical volumes, a host computer that is connected to the storage device and that has an access processing unit for accessing each of the logical volumes, and a management computer connected to the storage device and the host computer, comprising the steps of: collecting performance information on the performance of respective elements on a communication path extending from the host computer to the storage device; detecting a faulty element with an obstacle hindering performance improvement on the basis of the collected performance information on the respective elements; selecting, based on the nature of the obstacle of the faulty elements thus detected, a measure to change at least either one of the logical volume and the access processing unit associated with the faulty element to another logical volume or another access processing unit; and presenting the selected measure to the user.

The functions, means, and all or some of the steps of the invention can also be constituted as a computer program that is run by a microcomputer. Further, computer programs can be secured and distributed on a storage medium such as hard disk, optical disk, or semiconductor memory, for example. Otherwise, computer programs can be distributed via a communication network such as the Internet.

BRIEF DESCRIPTION OF THE DRAWINGS

FIG. 5A is an explanatory view of the constitution of host performance information and FIG. 5B is an explanatory view of the constitution of switch performance information;

FIG. 6A is an explanatory view of the constitution of storage-port performance information and FIG. 6B is an explanatory view of the constitution of parity-group performance information;

FIG. 7 is an explanatory view of the constitution of the LDEV performance information:

FIG. 8 is an explanatory view of the constitution of path information;

FIG. 9 is an explanatory view of the constitution of measure information;

FIG. 10A is an explanatory view of the constitution of host threshold value information;

FIG. 10B is an explanatory view of the constitution of switch threshold value information;

FIG. 10C is an explanatory view of the constitution of storage-port threshold value information;

FIG. 11A is an explanatory view of the constitution of parity group threshold value information, and FIG. 11B is an explanatory view of the constitution of LDEV threshold value information;

FIG. 17 is an explanatory view that partially shows an aspect in which simulation is performed by means of a table operation.

DESCRIPTION OF THE PREFERRED EMBODIMENTS

An embodiment of the present invention will be described below with reference to the drawings. The storage system of the present embodiment is an information processing system having a plurality of data storage elements for storing data (logical volumes, for example), a plurality of data usage elements (device files, for example) for accessing the data stored in the respective data storage elements, at least one or more relay elements (switches, for example) provided between the respective data storage elements and the respective data usage elements, and a path that extends from the respective data usage elements to the respective data storage elements via the relay elements.

Further, the storage system can comprise a performance information collection unit; a faulty element detection unit; a reviewing unit; and a presentation unit. The performance information collection unit collects information on the performance of the respective elements such as the load state thereof, for example. The faulty element detection unit detects a faulty element with an obstacle hindering performance improvement such as a performance bottleneck based on the collected performance-related information. The reviewing unit reviews the nature of the obstacle of the faulty element thus detected and selects a measure that is effective against the obstacle by simulating at least one or more measures for changing at least any one of the data usage elements or data storage elements associated with the faulty element among the respective data usage elements and the respective data storage elements to another data usage element or another data storage element. The presentation unit then presents the selected measure.

Figure 1:
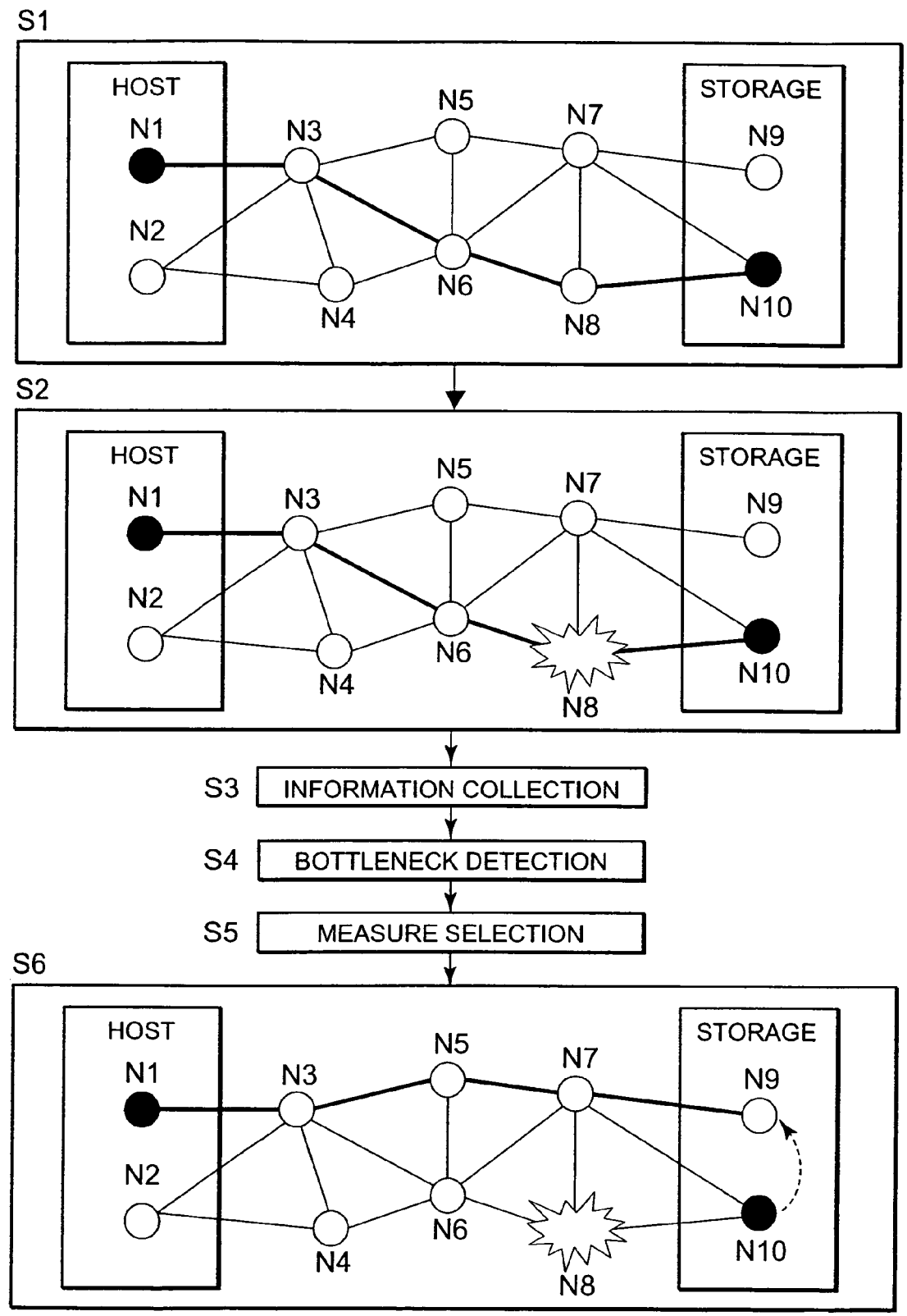
FIG. 1 is an explanatory view of the concept of the embodiment of the present invention.

FIG. 1 is an explanatory view schematically showing the overall concept of the embodiment. The storage system comprises at least one or more host computers and storage devices and comprises a plurality of elements N1 to N10.

The elements N1 to N10 can be classified into several groups in accordance with the location on the information processing path. Several elements N1, N2 belong to a host computer that is at one end of the information processing path, while several other elements N9, N10 belong to a storage device constituting the other end of the information processing path. The remaining elements N3 to N8 are located midway along the information processing path, interposed between the host computer and the storage device.

Here, the elements N1 and N2 belonging to the host computer are file systems, device files, and so forth, for example, which constitute data-usage elements. The elements N9 and N10, which belong to the storage device, are, for example, logical volumes, parity groups, and so forth that constitute data-storage elements. The elements N3 to N8, which are located midway along the information processing path, are, for example, switches, hubs, and so forth, which constitute relay elements.

As shown in S1, element N1, which is located at one end, and element N10, which is located at the other end, are connected via a predetermined path. That is, element N1 is connected to N10 via N3, then N6, and then N8 (N1→N3→N6→N8→N10). When, for example, an application program (not shown) issues an access request to a device file (N1) via a file system (not shown), the access request reaches a logical volume (N10) via N3, N6, and N8.

At a certain point in time, a bottleneck occurs in element N8 located on the path between elements N1 and N10, as shown in S2. For example, in cases where element N8 is used for another data process and an excessive load on element N8 occurs, the responsiveness of element N8 and so forth drops and a bottleneck occurs.

The storage system of this embodiment collects information on the performance of each of the elements N1 to N10 at regular intervals (S3). Further, the storage system detects a bottleneck (N8 in the illustrated example) on the basis of the latest states of each of the elements N1 to N10 (S4). The storage system reviews one or a plurality of measures for eliminating the bottleneck and selects the measure judged to be effective in eliminating the bottleneck (S5).

By changing element N10 used by element N1 to another N9, the storage system sets a new path that avoids element N8. Element N1 on the host-computer side accesses element N9 on the storage device side via element N3, then element N5, and then element N7 (N1→N3→N5→N7→N9). That is, in this embodiment, by changing elements N1 and N2, and N9 and N10 located at the two ends of the information processing path respectively instead of reviewing measures to directly avoid element N8 constituting the bottleneck, the bottleneck is accordingly eliminated.

Figure 2:
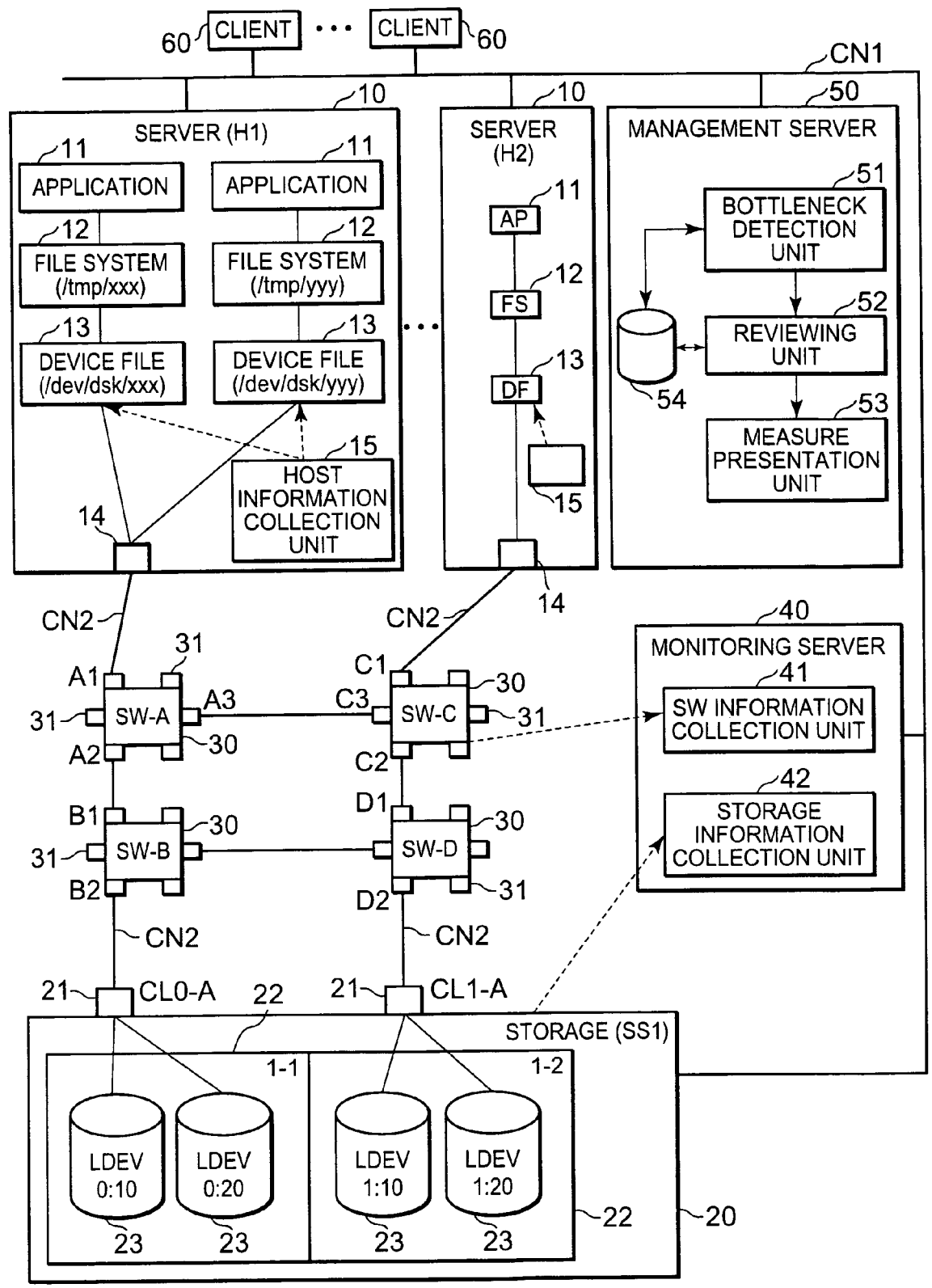
FIG. 2 is a block diagram showing the whole constitution of the storage system.

FIG. 2 is a block diagram showing the whole constitution of the storage system. As will be described subsequently, this storage system comprises a plurality of application servers 10 ('servers' hereinbelow), one storage device 20, a plurality of fiber channel switches ('switches' hereinbelow) 30, one monitoring server 40, one management server 50, and a plurality of client terminals 60.

Each of the servers 10 is equipped with one or a plurality of application programs (abbreviated to 'applications' hereinbelow) 11, one or a plurality of file systems 12, one or a plurality of device files 13, a communication port 14 such as an HBA (Host Bus Adapter), and a host information collection unit 15. The respective servers 10 are computers that are each provided with computer resources such as a CPU (Central Processing Unit), a ROM (Read Only Memory), a RAM (Random Access Memory), and a variety of driver software, and so forth, for example.

The application program 11 accesses the device file 13 via the file system 12. The file system 12 is a program for managing the data inputs/outputs in file units. The device file 13 is a program for calling a device driver integrated with the OS (Operating System) kernel. The communication port 14 performs data communications on the basis of a predetermined protocol such as the Fiber Channel protocol, for example.

When the application program 11 accesses the device file 13, the device driver is started up. Accordingly, the application program 11 accesses the storage device 20 via the communication port 14 to read and write data.

The host information collection unit 15 is a program for collecting information on the performance of the server 10 at regular intervals and sending the collected performance information to the management server 50. As an example of information on the performance of the server 10, the host information collection unit 15 collects the I/O volume per unit of time of the device file 13 at regular intervals.

The storage device 20 comprises one or a plurality of communication ports 21, one or a plurality of parity groups 22, and one or a plurality of logical volumes 23. Although only one is shown in FIG. 2, a plurality of the storage device 20 can also be provided. Each communication port 21 performs data communications with the respective servers 10 on the basis of a predetermined protocol such as the Fiber Channel protocol, for example. Each parity group 22 groups a plurality of disk groups respectively. At least one or more LDEV 23 can be constructed on the physical storage area provided by each parity group 22. Each LDEV 23 is a logical storage device (logical volume). The constitution of the storage device 20 will be described in more detail subsequently.

Each switch 30 comprises a plurality of ports 31. 'Switch' is abbreviated to 'SW' in the drawings. The storage device 20 and respective servers 10 are fabric-connected to the switches 30. The switches 30 and servers 10 are connected by means of a communication network CN2 that adheres to the Fiber Channel Protocol. Further, the switches 30 and storage device 20 are connected by means of the communication network CN2 that adheres to the Fiber Channel protocol.

The monitoring server 40 monitors the status of the respective switches 30, storage devices 20, and so forth, and reports the monitoring results to the management server 50. The monitoring server 40 comprises a switch information collection unit 41 for collecting information on the performance of the switches 30, and a storage information collection unit 42 for collecting information on the performance of the storage device 20. The switch information collection unit 41 collects the I/O volume per unit of time of each port 31 of each switch 30. The storage information collection unit 42 collects the I/O volume per unit of time of each port 21 of the storage device 20, each parity group 22 and each LDEV 23. Further, although the I/O volume (data input/output required amount) is cited here as an example of performance information, performance information is not limited to the I/O volume; other information such as the response time can also be adopted, for example. Further, the monitoring server 40 can also be integrated with the management server 50. Alternatively, any of the servers 10 may be provided with a monitoring function.

The management server 50 comprises a bottleneck detection unit 51, a reviewing unit 52, a measure presentation unit 53, and a performance information database 54. The details will be provided subsequently, but the management server 50 collects the respective performance information at regular intervals from each of the host information collection units 15, the switch information collection unit 41, and the storage information collection unit 42. Further, the management server 50 detects the bottleneck within the storage system and reviews measures for eliminating the bottleneck. The management server 50 then presents the review results to the user.

Figure 3:
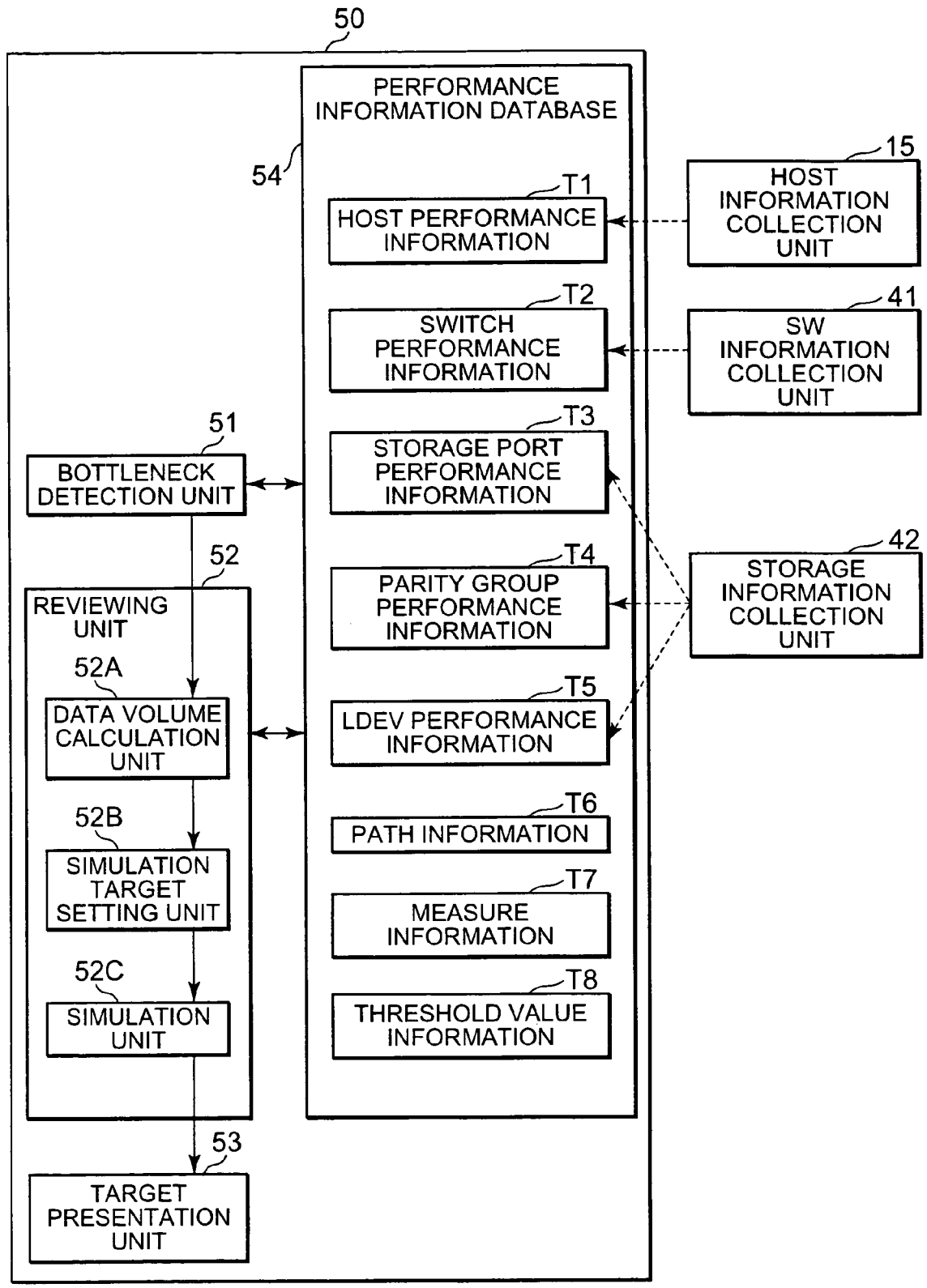
FIG. 3 is a block diagram showing the constitution of a management server.

FIG. 3 is an explanatory view of the functional constitution of the management server 50. As will be described subsequently, the performance information database 54 can be made to store host performance information T1, switch-performance information T2, storage port performance information T3, parity group performance information T4, LDEV performance information T5, path information T6, measure information T7, and threshold value information T8. Each of these information items T1 to T8 need not be in the same database 54. Instead, same may be stored discretely in a plurality of different databases.

The bottleneck detection unit 51 detects whether a performance bottleneck occurs in each of the elements constituting the storage system (for example, the device file 13, switch port 31, storage port 21, parity group 22, and LDEV 23). Here, states that can lead to a bottleneck in the future can also be included without the need for a performance bottleneck to be actualized. That is, although also different depending on the threshold-value settings described subsequently, states prior to actual bottleneck actualization can be detected as bottlenecks.

The reviewing unit 52 can comprise a data amount calculation unit 52A, a simulation target setting unit 52B, and a simulation unit 52C. The data amount calculation unit 52A specifies a device file allowing the element subject to the bottleneck to generate I/O, and calculates the I/O volume of the device file that is the cause of the bottleneck. The simulation target setting unit 52B extracts the target for simulating bottleneck elimination measures. The simulation unit 52C performs a predetermined simulation on the extracted target and then evaluates the results. Therefore, when a bottleneck is detected, the reviewing unit 52 simulates one or a plurality of measures for eliminating the bottleneck and attempts to find an effective measure. When an effective measure is found, the reviewing unit 52 selects this measure.

The measure presentation unit 53 presents the measure selected by the reviewing unit 52 to the user. The measure presentation unit 53 presents the measure judged as being effective by means of a display output from a terminal screen or a voice output from a voice synthesizer, and so forth, for example. The user reviews the measure thus presented and is thus able to judge whether to accept the proposal. In cases where the user accepts the proposal, the user is able to change the constitution of the storage system via the management server 50, for example. Further, depending on the case, the constitution may be one in which the presentation to the user is excluded, any changes to the constitution of the storage system being executed directly. In this case, the measure presentation unit 53 can be called the 'measure execution instruction unit'.

Figure 4:
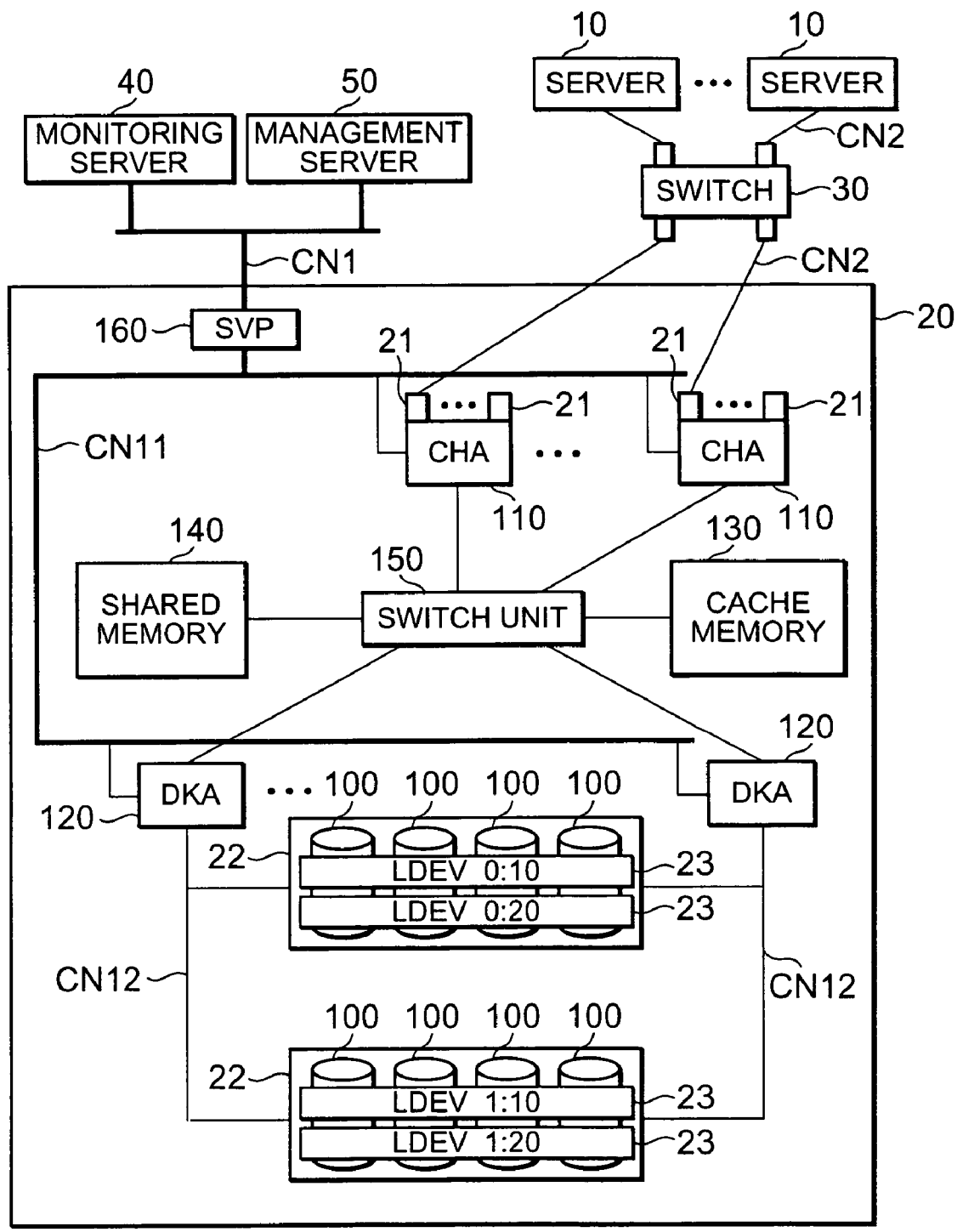
FIG. 4 is a block diagram showing the constitution of the storage device.

FIG. 4 is an explanatory view of the functional constitution of the storage device 20. The storage device 20 is connected to each of the plurality of servers 10 via the communication network CN2 so as to capable of two-way communications.

A LAN (Local Area Network), SAN (System Area Network), the Internet, or a dedicated line, or the like, for example, can be adopted as the communication network. When a LAN is used, data transfers between the respective servers 10 and the storage device 20 are performed in accordance with TCP/IP. When a SAN is employed, data transfers between the respective servers 10 and the storage device 20 are executed in accordance with the Fiber Channel protocol. Furthermore, when mainframe machines are used in place of the servers 10, data transfers may be performed in accordance with a communication protocol such as the FICON (Fibre Connection: registered trademark), ESCON (Enterprise System Connection: registered trademark), ACONARC (Advanced Connection Architecture: registered trademark), and FIBARC (Fibre Connection Architecture: registered trademark) communication protocols, for example.

In this embodiment example, the respective servers 10 and the storage device 20 are connected by means of a SAN, and the respective servers 10 and the monitoring server 40 and management server 50 are connected by means of a LAN. Further, when the storage device 20 comprises a LAN port, the storage device 20 and management server 50, and so forth, can also be connected via a LAN. Alternatively, normal data transfers and the transfer of management information can also be performed via the SAN.

As will be described subsequently, the storage device 20 comprises a disk drive 100, a channel adapter ('CHA' hereinbelow) 110, a disk adapter ('DKA' hereinbelow) 120, a cache memory 130, a shared memory 140, a switch unit 150, and a service processor ('SVP' hereinbelow) 160.

The respective disk drives 100 can be implemented as a hard disk drive (HDD) or a semiconductor memory device, or the like, for example. The disk drive 100 is a physical storage device. Variations also exist depending on the RAID constitution and so forth, but, a plurality of the disk drives 100, such as a set of three or a set of four, constitute a parity group (also called a RAID group), for example. Further, LDEV 23 are constructed on the storage areas provided by each parity group. FIG. 4 shows an aspect in which the LDEV 23 are constituted in twos in two parity groups 22, but the constitution is not limited to such a constitution. It is also possible to provide three or more parity groups 22 and suitably set the LDEV 22. Further, the storage resources supplied to each server 10 by the storage device 20 need not all be provided within the storage device 20. The storage device 20 is also able to incorporate and use storage resources that exist outside the storage device 20 as if these storage resources were its own storage resources.

Each CHA 110 controls data transfers with each of the servers 10 and comprises a plurality of ports 21. The storage device 20 is able to provide a plurality of CHA110, such as 32 thereof, for example. The CHA 110 are prepared in accordance with the type of server 10 as open-system CHA or main frame CHA, for example. Further, a plurality of protocols may be constituted permitting support in one CHA 110. Each CHA 110 receives data and commands requesting the reading/writing of data from the servers 10 connected to each CHA 110, and operates in accordance with the commands received from the servers 10.

If a description including the operation of the DKA 120 is first provided, when the CHA 110 receives a read command from the server 10, the read command is stored in the shared memory 140. The DKA 120 references the shared memory 140 as needed, and, upon finding an unprocessed read command, reads data from the disk drive 100 and stores same in the cache memory 130. The CHA 110 reads the data that has moved to the cache memory 130 and transfers this data to the server 10.

When, on the other hand, the CHA 110 receives a write command from the server 10, the CHA 110 stores the write command in the shared memory 140. The CHA 110 then stores the received data (user data) in the cache memory 130. After storing the data in the cache memory 130, the CHA 110 reports the completion of writing to the server 10. In accordance with the write command stored in the shared memory 140, the DKA 120 reads the data stored in the cache memory 130 and stores this data in a predetermined disk drive 100.

A plurality of the DKA 120 (such as four or eight thereof, for example) can be provided in the storage device 20. Each DKA 120 controls data communications with the respective disk drives 100. The respective DKA 120 and respective disk drives 100 are connected via a communication network CN 12 such as a SAN, for example, and perform data transfers in block units in accordance with the Fiber Channel protocol. The respective DKA 120 monitor the states of each of the disk drives 100 as needed and the monitoring results are sent to the SVP 28 via an internal network CN11 such as a LAN.

The respective CHA 110 and DKA 120 each comprise a print substrate where a processor, memory, and so forth are mounted, and a control program (neither is illustrated) that is stored in memory, for example. Predetermined functions are implemented by means of collaboration between the hardware and software.

The cache memory 130 stores user data or the like, for example. The cache memory 130 is constituted by a nonvolatile memory, for example.

The shared memory (or control memory) 140 is constituted by a nonvolatile memory, for example. Control information and management information, and so forth, for example, are stored in the shared memory 140. Information such as this control information can be multiplexed and managed by means of a plurality of shared memories 140. Respective pluralities of the shared memory 140 and cache memory 130 can be provided.

Here, the cache memory 130 and shared memory 140 can also be combined and mounted on the same memory substrate. Alternatively, part of the memory can be used as a cache region and the other part can be used as a control region.

The switch unit 150 connects each CHA 110, each DKA 120, cache memory 130, and shared memory 140. Accordingly, all the CHA 110 and DKA 120 are able to access the cache memory 130 and shared memory 140. The switch unit 150 can be constituted as an ultra high-speed crossbar switch or similar, for example.

The SVP 28 is connected to each CHA 110 and each DKA 120 via the internal network CN11. The SVP 28 is able to access the shared memory 140 via the CHA 110, for example. Further, the SVP 28 is connected to the monitoring server 40 and management server 50 via the communication network CN1. The SVP 28 collects various states within the storage device 20 and sends these states to the monitoring server 40 or management server 50. Further, the SVP 28 need not be provided within the enclosure of the storage device 20. The SVP 28 can also be provided outside the enclosure.

Next, an example of the information items T1 to T8 will be provided with reference to FIGS. 5 to 11. FIG. 5A shows the constitution of the host performance information T1. Host performance information T1 can be constituted by associating the names of each server 10 (host names), device file names, performance-information collection times and I/O volumes per unit of time, for example. The server 10 specified by the host name 'H1' comprises two device files '/dev/dsk/xxx', and '/dev/dsk/yyy'. The I/O volume per unit of time is collected and stored at 10 minute intervals in each of the device files.

For example, in the case of one device file '/dev/dsk/xxx', a 5000 byte I/O is produced every second at time 10:00 (24-hour clock). Further, the I/O volume per unit of time of the same device file increases by 1000 bytes after 10 minutes to become 6000 (bytes per second). In the case of the other device file 'dev/dsk/yyy', a 1000-byte I/O is produced every second at time 10:00. Further, the I/O volume per unit of time of the same device file does not change after 10 minutes.

The switch-performance information T2 shown in FIG. 5B can be constituted by associating switch names, port names, performance-information collection times, and I/O volumes per unit of time, for example. As shown in FIG. 2, two device files 13 are connected to a port specified by the port name 'A1' in the switch 30 specified by the switch name 'SW-A'. Access requests from the two device files 13 each enter port 'A1'. Therefore, the I/O volume per unit of time of port 'A1' becomes 6000 (bytes per second) at time 10:00.

FIG. 6A shows the constitution of the storage port performance information T3. The storage port performance information T3 can be constituted by associating storage device names, storage port names, performance-information collection times, and I/O volumes, for example. As shown in FIG. 1, in the storage device 20 specified by the storage device name 'SS1', two LDEV '0:10' and '0:20' belonging to the parity group '1-1' are connected to the storage port 21 specified by the port name 'CL0-A'.

Here, one device file 'dev/dsk/xxx' accesses one LDEV '0:10' and the other device file 'dev/dsk/yyy' accesses the other LDEV '0:20'. Therefore, because access by both device files enters the storage port 'CL0-A', the I/O volume per unit of time at time 10:00 becomes 6000 bytes.

FIG. 6B shows the constitution of the parity group performance information T4. The parity group performance information T4 can be constituted by associating storage device names, parity group names, performance-information collection times, and I/O volumes per unit of time, for example. For example, the parity group 22 specified by the parity group name '1-1' has two LDEV '0:10' and '0:20'. Therefore, the I/O volume per unit of time at time 10:00 of the parity group '1-1' then becomes 6000 bytes.

FIG. 7 shows the constitution of LDEV performance information T5. The LDEV performance information T5 can be constituted by storage device names, LDEV names, performance-information collection times, and I/O volumes per unit of time, for example. For example, the LDEV '0:10' which is used by the device file '/dev/dsk/xxx', produces a 5000 (bytes per second) I/O at time 10:00. Further, the LDEV '0:20' used by the device file '/dev/dsk/yyy' generates a 1000 (bytes per second) I/O at time 10:00.

FIG. 8 shows the constitution of the path information T6. The path information T6 stores the constitution of each path within the storage system. The path information T6 can be constituted by associating host names, device file names, transmission-side switch port names, reception-side switch port names, storage device names, parity group names, the names of the ports of the storage device 20, and LDEV names, for example.

For example, an access request issued by the device file '/dev/dsk/xxx' is inputted to port 'A1' of switch 'SW-A' and then outputted from port 'A2'. This access request is inputted from port 'A2' to port 'B1' of switch 'SW-B' and then outputted from port 'B2'. The access request thus outputted from port 'B2' is inputted to the storage port 'CL0-A' of the storage device 20 before reaching LDEV '0:10'. On the other hand, similarly to the other device file '/dev/dsk/yyy', a connection is made to LDEV '0:20' via port 'A1', port 'A2', port 'B1', port 'B2' and storage port 'CL0-A'.

FIG. 9 shows the constitution of measure information T7. Measure information T7 can be constituted by associating item numbers, measure names, ranges of influence, and priority levels, for example. Here, the 'range of influence' signifies the range of influence of the measure and is information that indicates the range over which the bottleneck elimination effect is to be expected when this measure is implemented. That is, in the case of this embodiment example, for the 'range of influence', the name of elements in which a variation in the I/O volume per unit of time is probable when this measure is implemented is registered.

The 'measure name' is information for discriminating a plurality of pre-prepared measures. The details will be provided subsequently but possible measures include, for example, 'change to the LDEV used by the application program 11', 'change to the host on which the application program 11 runs', and 'change to the parity group to which the LDEV used by the application program 11 is to belong', and so forth. Each measure stored in the measure information T7 indicates the type of measure to be gained but does not indicate the specific details of the measure. For example, a measure such as 'change the LDEV used by the application program 11' only indicates a possibility of eliminating the bottleneck by changing the LDEV and does not include any information on which LDEV 23 is changed to which LDEV 23 specifically, and so forth. Therefore, each measure stored in the measure information T7 can also be called 'proposed measure', 'measure classification', and 'measure objective', and so-forth, for example. For the sake of convenience in the following description, each of the above measures is abbreviated to 'LDEV change', 'host change', and 'parity group change' respectively.

The 'priority level' is information indicating the order in which each of the measures is reviewed. The smaller the figure for the priority level, the higher the priority ranking. For example, priority level '1' is set for 'LDEV change', priority level '2' is set for 'host change' and priority level '3' is set for 'parity group change'. In eliminating a bottleneck, the reviewing unit 52 reviews measure efficacy in order of priority starting with the measure with the highest priority level. Therefore, although there is variation depending on the point at which the bottleneck occurs, or the like, the higher the priority level of the measure, the higher the probability that the measure will be implemented.

To describe the range of influence of each measure simply, it is probable that the 'LDEV change' will exert an influence on the switch port 31, storage port 21, parity group 22, and LDEV 23 in this order. However, this does not mean that the degree of influence grows weaker in this order and nor is this embodiment example limited to this order. In addition, there is a possibility that 'host change' will also affect the device file 13. 'Parity group change' will probably affect the same elements as 'LDEV change'.

FIGS. 10 and 11 show the constitution of threshold value information T8. Threshold value information T8 can be prepared for the respective elements. If threshold values for each element are set in order to be able to detect states, prior to the occurrence of a bottleneck, the probability of a bottleneck occurring can also be predicted before a bottleneck actually occurs.

As shown in FIG. 10A, host threshold value information T8 (1) can be constituted by associating host names, device file names, and threshold values, for example. Common threshold values can be set for each device file 13 or different threshold values can be set for same.

As shown in FIG. 10B, the switch threshold value information T8 (2) can be constituted by associating switch names, port names, and threshold values, for example. Similarly, common threshold values may be set for each switch port or different threshold values may be set for same.

As shown in FIG. 10C, the storage port threshold value information T8 (3) can be constituted by associating storage device names, port names, and threshold values, for example. Common threshold values can be set for each storage port or different threshold values can be set for same.

As shown in FIG. 11A, the parity group threshold value information T8 (4) can be constituted by associating storage device names, parity group names, and threshold values, for example. As mentioned earlier, common threshold values may be set for each parity group or different threshold values may be set for same.

As shown in FIG. 11B, the LDEV threshold value information T8 (5) can be constituted by associating storage device names, LDEV names (LDEV numbers) and threshold values, for example. Common threshold values may be set for each LDEV or different threshold values may be set for same.

Figure 12:
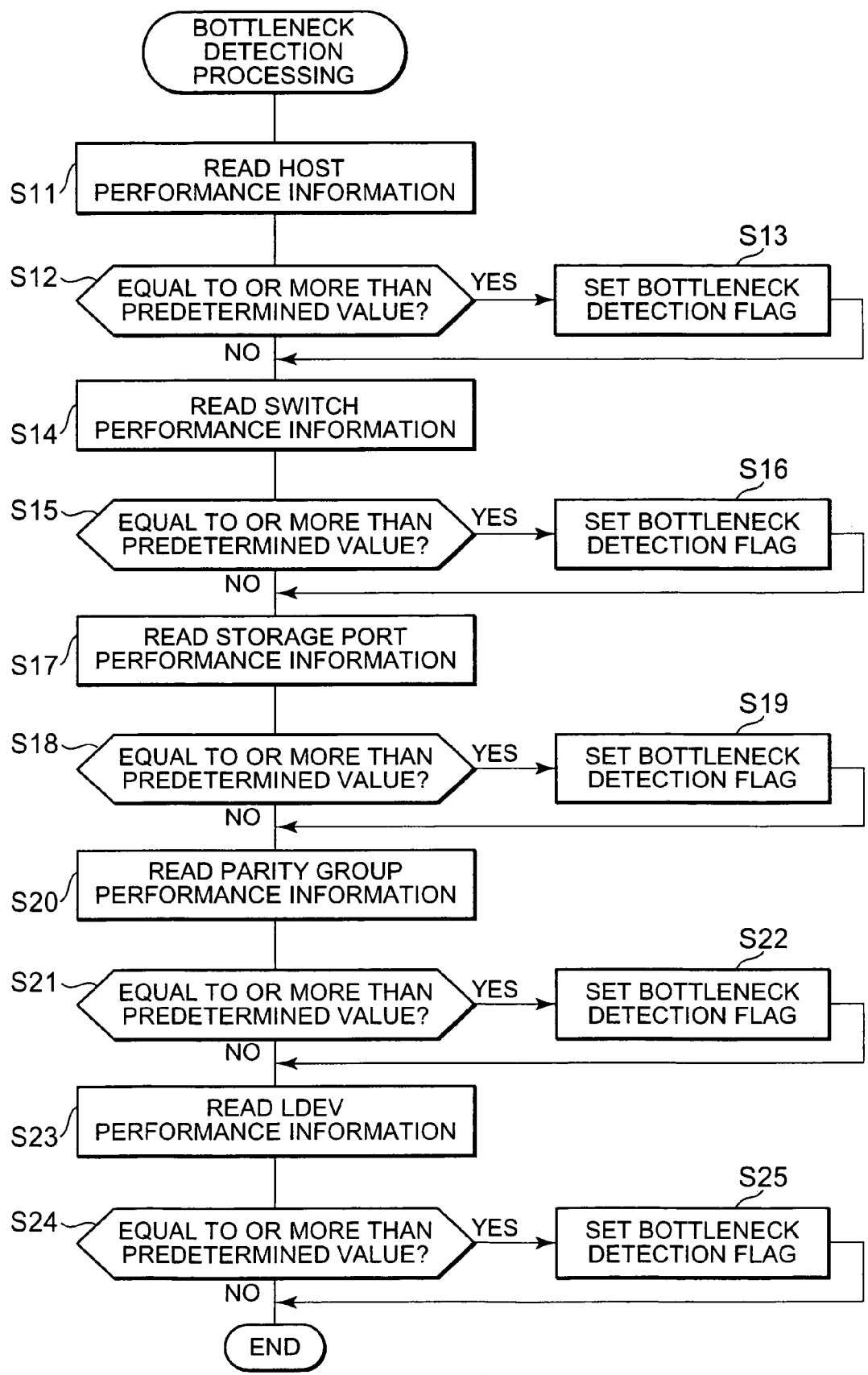
FIG. 12 is a flowchart showing bottleneck-detection processing.

FIG. 12 is a flowchart showing an overview of the bottleneck-detection processing that is executed by the management server 50. As a prerequisite prior to executing bottleneck-detection processing, the management server 50 collects the load states of the respective elements (I/O volumes per unit of time) in predetermined cycles and registers the load states in the database 54. The bottleneck detection processing can be executed in accordance with the performance-information collection cycles.

The management server 50 first reads the latest host performance information T1 from the database 54 (S11) and then judges whether the I/O volume per unit of time of each device file 13 is equal to or more than a predetermined threshold value (S12). When a device file 13 equal to or more than the predetermined threshold value is detected (S12: YES), the management server 50 sets a bottleneck detection flag for the device file 13 in the high-load state (S13). The bottleneck detection flag is information indicating a state where the element is currently subject to a bottleneck or a state where a bottleneck is probable.

After the scanning of host performance information T1 is complete, the management server 50 reads the latest switch-performance information T2 from the database 54 (S14), and judges whether the I/O volume per unit of time of each switch port 31 is equal to or more than a predetermined threshold value (S15). In cases where a switch port 31 equal to or more than the predetermined threshold value is detected (S15: YES), the management server 50 sets a bottleneck-detection flag for the switch port 31 (S16).

After the scanning of the switch-performance information T2 is complete, the management server 50 reads the latest storage port performance information T3 from the database 54 (S17). The management server 50 judges whether the I/O volume per unit of time of each storage port 21 is equal to or more than a predetermined threshold value (S18). When a storage port 21 in which an I/O volume equal to or more than the predetermined threshold value is produced is detected (S18: YES), the management server 50 sets the bottleneck detection flag for this storage port 21 (S19).

The management server 50 then reads the latest parity-group performance information T4 from the database 54 (S20) and judges whether a parity group 22 in which the I/O volume per unit of time is equal to or more than a predetermined threshold value exists (S21). When a parity group 22 equal to or more than the predetermined threshold value is detected (S21: YES), the management server 50 sets a bottleneck detection flag (S22) for the parity group 22.

The management server 50 then reads the latest LDEV performance information T5 (S23), and judges whether an LDEV 23, in which the I/O volume per unit of time is equal to or more than a predetermined threshold value (S24), exists. When an LDEV 23 equal to or more than the predetermined threshold value is detected (S24: YES), the management server 50 sets a bottleneck detection flag for this LDEV 23 (S25).

As mentioned above, the management server 50 judges whether a bottleneck exists in each of the monitored elements on the basis of the latest performance information for each element, thus detecting the elements subject to a bottleneck. When the performance information collected from each element is updated, the management server 50 is able to execute the bottleneck-detection processing shown in FIG. 12 once again.

Figure 13:
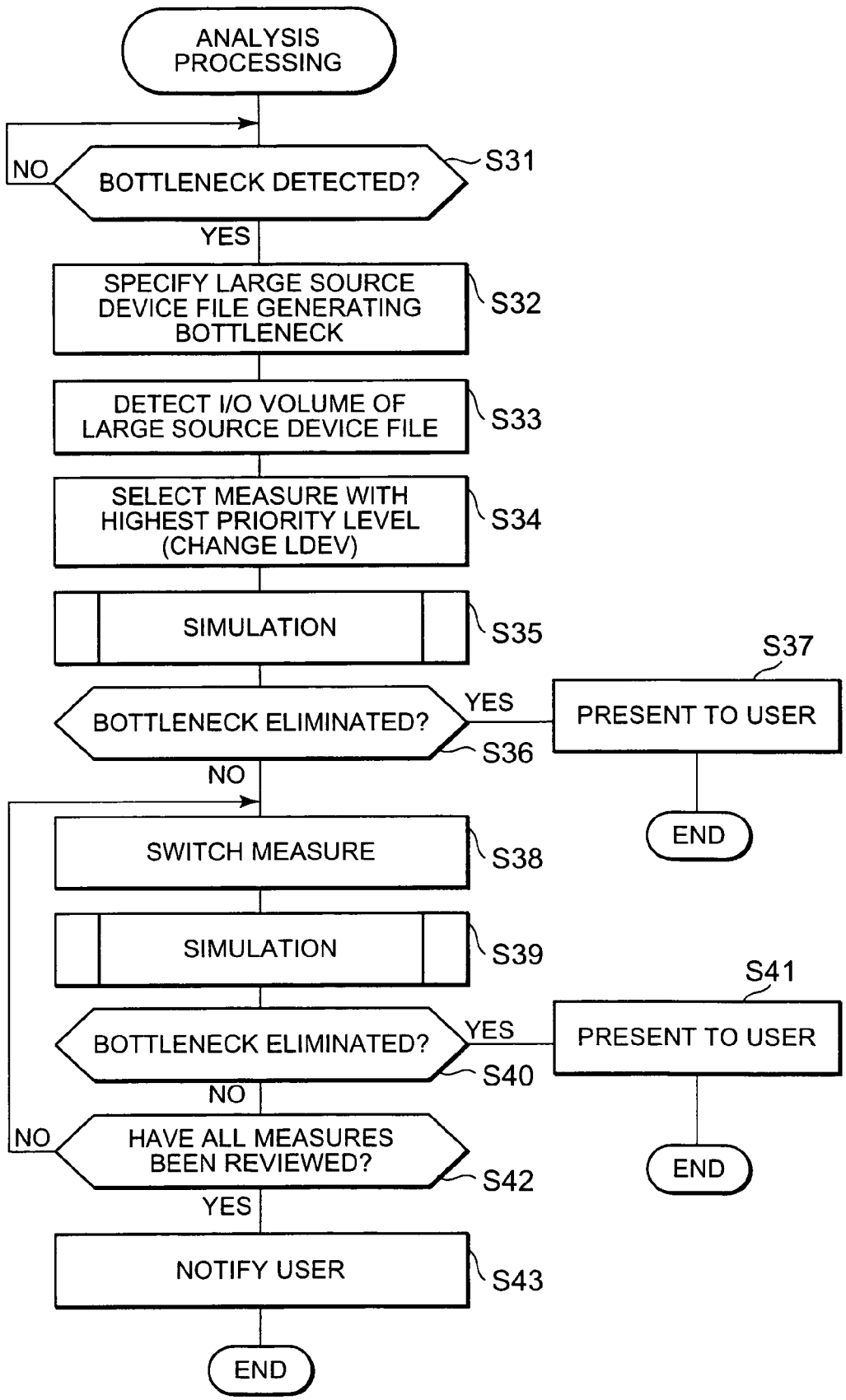
FIG. 13 is a flowchart showing analysis processing.

FIG. 13 is a flowchart showing an overview of the bottleneck analysis processing (measure reviewing processing) of the management server 50. This analysis processing can be executed in accordance with the end of the bottleneck detection processing.

The management server 50 judges whether a bottleneck has been detected (S31). A case where a bottleneck detection flag has been set indicates that a bottleneck has been detected within the storage system.

When a bottleneck has been detected (S31: YES), the management server 50 specifies the device file 13 (S32) producing the I/O in the element subject to the bottleneck by referencing the path information T6. As mentioned earlier, the connected relationships of the respective elements are recorded in the path information T6 for each path in the storage system. Further, when the device file 13 itself is the bottleneck, the device file 13 is specified as the device file that is the origin of the bottleneck.

The management server 50 confirms the latest I/O volume per unit of time of the device file 13 causing the bottleneck (S33). Thereafter, the management server 50 performs simulations in order of priority starting with the measure with the highest priority level. Because the highest priority level is assigned to 'LDEV change' in this embodiment example, the management server 50 first selects 'LDEV change' (S34). The management server 50 then performs a simulation to determine whether the measure in which the LDEV 23 is changed is effective in eliminating the bottleneck (S35). This simulation process will be described-further subsequently.

The management server 50 judges whether the bottleneck has been eliminated by implementing the 'LDEV change' measure (S36) Upon judging that the bottleneck has been eliminated (S36: YES), the management server 50 presents the specific change method for the 'LDEV change' to the user (S37). A user such as a system administrator is then able to review the specific details of the measure proposed by the management server 50. When adopting a specific measure proposed by the management server 50, the user is able to change the constitution of the storage system when a predetermined time comes.

For example, in cases where the bottleneck detected by the management server 50 is only temporary and transitional and causes no particular problems even when left alone, the user is able to disregard the guidance from the management server 50. Conversely, in cases where the bottleneck detected by the management server 50 is long-term and constant, and has an adverse effect on the performance of the storage system, for example, the user is able to change the constitution of the storage system immediately or at the desired time.

In cases where the bottleneck has not been eliminated by the 'LDEV change' measure (S36: NO), the management server 50 selects the measure with the next-highest priority (S38). In this embodiment example, the efficacy of the 'host change' measure is reviewed (S39). The simulation processing of S39 will be described in more detail subsequently. The management server 50 judges whether the bottleneck can be eliminated by means of the second measure (S40). When the bottleneck can be eliminated by means of the 'host change' measure (S40: YES), the management server 50 guides the user on the specific details of the measure (S41). This guidance can include information on which server 10 the server executing the application program 11 should be moved to, and so forth, for example. As mentioned above, the user reviews the specific guidance from the management server 50, and, in cases where this guidance is adopted, is able to execute the change when a predetermined time comes.

In cases where it has been judged that the second measure is not effective in the elimination of the bottleneck either (S40: NO), the management server 50 judges whether all the measures pre-registered in the measure information T7 have been reviewed (S42). In this embodiment example, 'parity group change' is prepared as a third measure, and therefore the 'parity group change' measure is then selected (S42: NO, S38), and the simulation and so forth is performed as mentioned above (S39 to S41).

In cases where, as a result of simulating the third measure, it is judged that the 'parity group change' measure is not effective in eliminating the bottleneck either (S40: NO), the management server 50 ends the review of all the pre-prepared measures (S42: YES). Therefore, the management server 50 reports only the detection of the bottleneck to the user (S43). The user, who has received this report, is then able to investigate whether to add storage devices or substitute storage devices for new products, and so forth.

Figure 14:
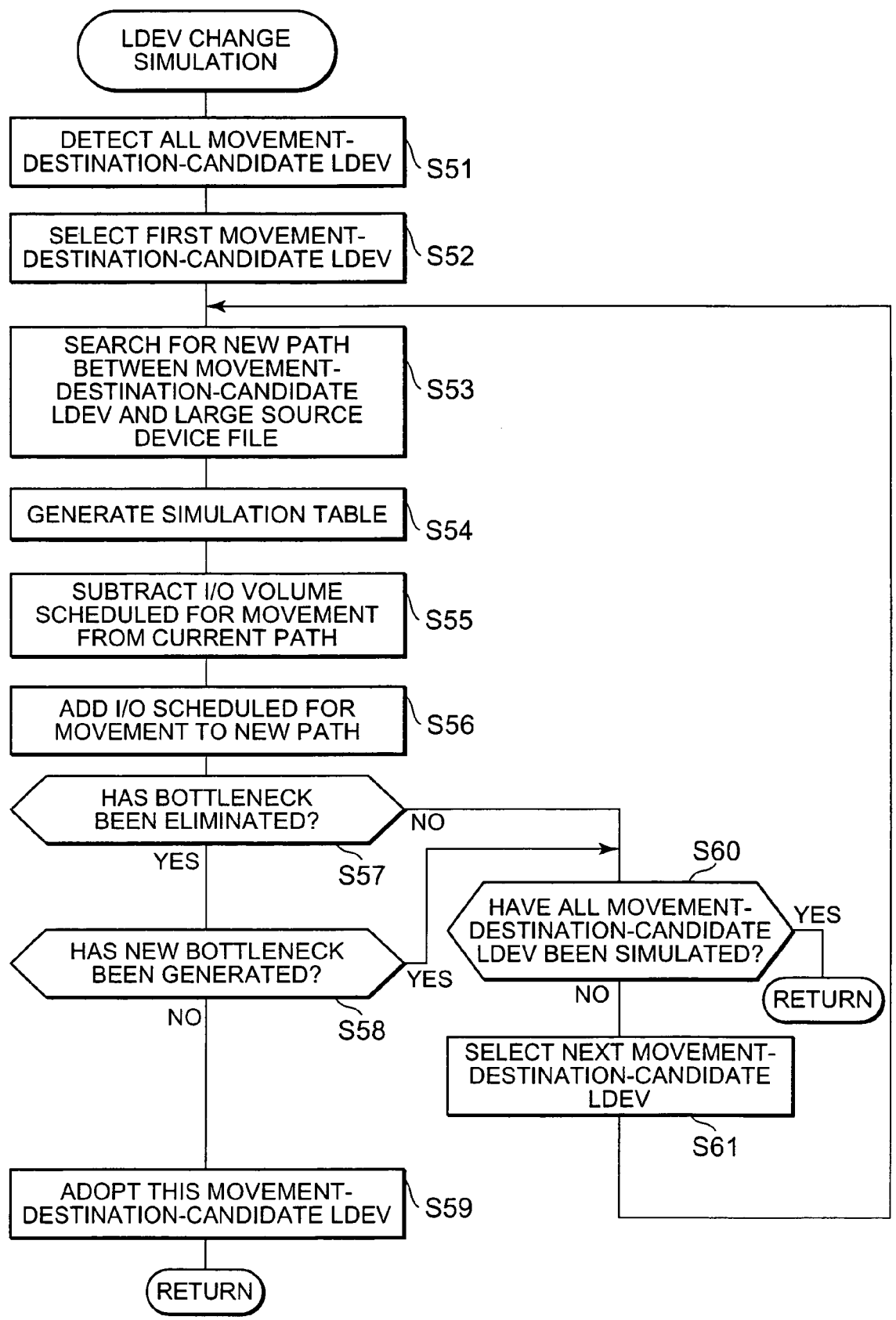
FIG. 14 is a flowchart showing simulation processing for an LDEV change measure.

The method for simulating each measure will be described on the basis of FIGS. 14 to 16. FIG. 14 is a flowchart showing processing to simulate the 'LDEV change' measure. The management server 50 detects all the LDEV 23 to which the LDEV used by the I/O origin device file 13 (called the 'large source device file 13' or 'origin-generation source device file 13') can be moved (S51). LDEV that can be cited as examples of LDEV 23 allowing such movement are those LDEV 23 satisfying the following conditions, for example: (1) an access lock has not been set by another server 10 or application program 11, or the like, and (2) no obstacle is produced even when the I/O volume of the large source device file 13 is added.

The management server 50 then selects the first movement-destination-candidate LDEV among all the listed movement-destination-candidate LDEV (S52). The management server 50 then references the path information T6 and searches for a path between the first movement-destination-candidate LDEV and large source device file 13 (S53). That is, the management server 50 searches for a path in a case where the access destination LDEV of the large source device file 13 is moved to the first movement-destination-candidate LDEV. The path between the movement-destination-candidate LDEV 23 and the large source device file 13 is known as the 'new path' for the current path between the bottleneck LDEV 23 and the large source device file 13.

The management server 50 generates a simulation table by copying four tables, namely the switch performance information T2 to the LDEV performance information T5 (S54). Here, the copying of the host performance information T1 need not be prepared. As mentioned in conjunction with FIG. 9, the 'LDEV change' measure does not affect the performance of the device file 13, and hence a simulation for the device file 13 is omitted. That is, the management server 50 makes preliminary arrangements in order to perform the simulation in the range over which the measure has an influence. Subsequent simulations are executed by adding and subtracting the I/O volume on the basis of the copied tables.

The management server 50 subtracts the I/O volume scheduled for movement from each of the elements located on the current path (S55). The I/O volume scheduled for movement is the current I/O volume generated by the large source device-file 13. The management server 50 then adds the subtracted I/O volume to each of the elements located on the new path (S56).

The management server 50 judges whether the bottleneck that exists on the current path has been eliminated (S57). When it is judged that the bottleneck has been eliminated (S57: YES), the management server 50 judges whether a new bottleneck has been produced in any of the elements to which the I/O volume has been newly added (S58).

When a new bottleneck has not occurred in the elements on the new path (S58: NO), the management server 50 adopts this movement-destination-candidate LDEV 23 as the LDEV to be used for the 'LDEV change' measure (S59).

On the other hand, in cases where the bottleneck occurring at present is not eliminated even when the current I/O volume is switched to the movement-destination-candidate LDEV 23 (S57: NO), another movement-destination-candidate LDEV 23 must be reviewed. Further, another movement-destination-candidate LDEV 23 must also be reviewed when a new bottleneck is produced (S58: YES) by moving the I/O volume.

The management server 50 judges whether the simulation is complete for all the movement-destination-candidate LDEV 23 extracted in step S51 (S60). When unreviewed movement-destination-candidate LDEV 23 still remain (S60: NO), the management server 50 switches the movement-destination-candidate LDEV 23 to be reviewed (S61) and returns to S53.

Therefore, the management server 50 repeats the simulation for the listed movement-destination-candidate LDEV 23. In cases where it is judged that the bottleneck occurring at present has been eliminated and a new bottleneck has been produced, the management server 50 selects the movement-destination-candidate LDEV 23.

When a suitable movement-destination-candidate LDEV 23 cannot be detected even when the simulation for all the listed movement-destination-candidate LDEV 23 is complete (S60: YES), the LDEV change simulation is terminated and the processing returns to the processing shown in FIG. 13. In this case, the management server 50 performs a simulation for another measure.

Figure 15:
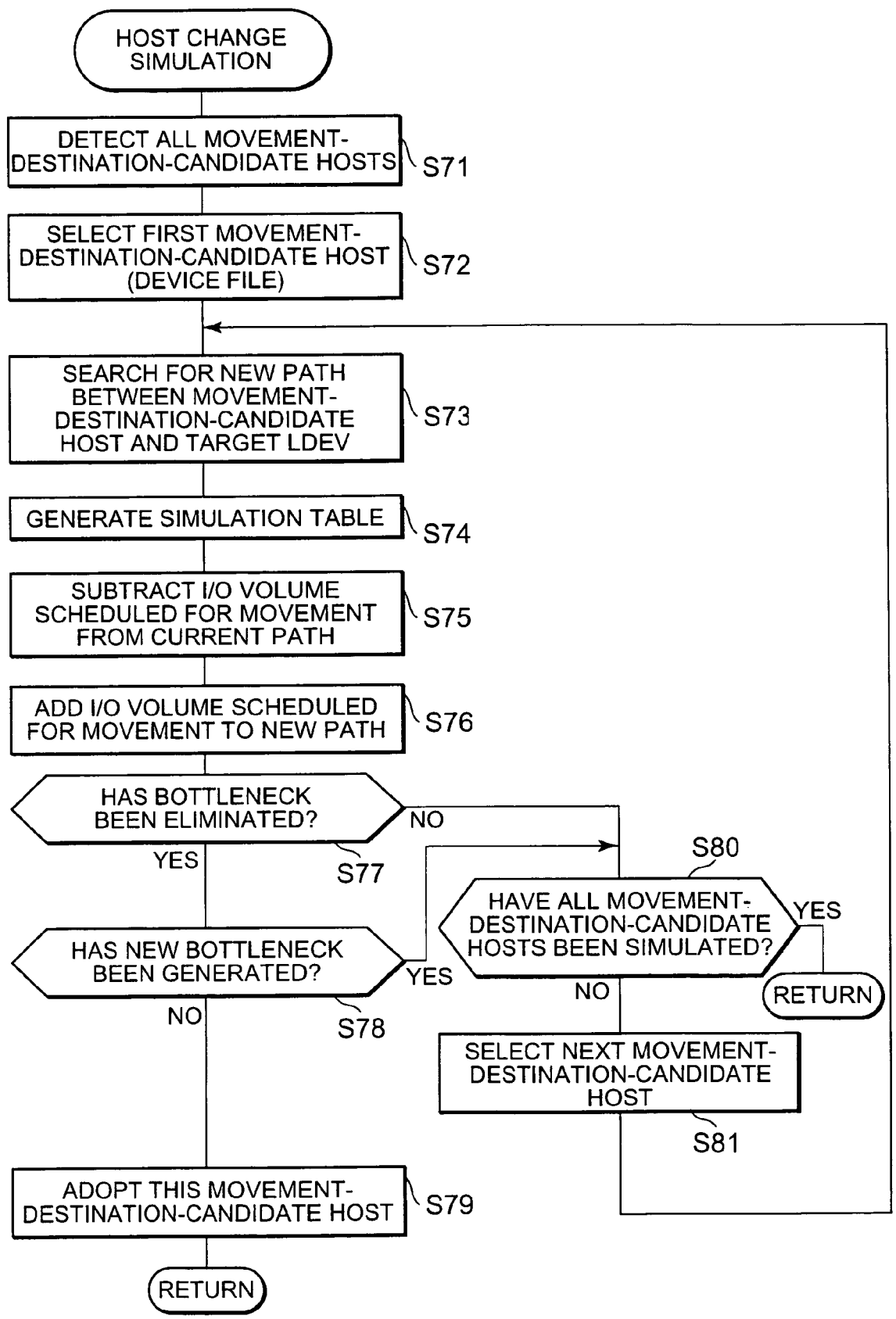
FIG. 15 is a flowchart showing simulation processing for a host change measure.

FIG. 15 is a flowchart showing simulation processing for the 'host change' measure. This simulation processing has the same basic structure as the processing of FIG. 14. The main difference is that the simulation target is the 'device file'.

The management server 50 detects all the movement-destination-candidate hosts (the movement-destination-candidate device files) (S71). The management server 50 extracts all of the other usable device files 13 instead of the current device file 13 constituting the origin of the bottleneck. For example, device files 13 that are not being used by any application program 11 are detected.

Of the listed movement-destination-candidate hosts, the management server 50 selects the first movement-destination-candidate host located at the start of the list (S72). The management server 50 searches for a new path linking the movement-destination-candidate host and the target LDEV 23 by referencing the path information T6 (S73) The target LDEV 23 denotes the LDEV 23 currently used by the current device file 13 (large source device file 13) generating the I/O causing the bottleneck.

The management server 50 then prepares a simulation table (S74). Here, as shown in FIG. 9, the effect of the 'host change' measure is exerted on the device file 13, switch port 31, storage port 21, parity group 22, and LDEV 23. Therefore, the management server 50 generates a copy of each of the host performance information T1, switch performance information T2, storage port performance information T3, parity group performance information T4, and LDEV performance information T5, and makes preparations for the simulation.

Thereafter, as mentioned above, simulations are executed by adding or subtracting the I/O volume on the basis of each of the simulation tables. First, the management server 50 subtracts the I/O volume scheduled for movement (the I/O volume per unit of time produced by the large source device file 13) from each of the elements located on the current path (S75) The management server 50 then adds the I/O volume scheduled for movement to each of the elements located on the new path retrieved in S73 (S76).

The management server 50 then judges whether the bottleneck occurring at present has been eliminated (S77). When it is judged that the current bottleneck has been eliminated (S77: YES), the management server 50 judges whether a new bottleneck has occurred in any of the elements located on the new path (S78). When it is judged that a new bottleneck has not been produced in any of the elements on the new path (S78: NO), the management server 50 selects the movement-destination-candidate host as a suitable host (S79).

When, on the other hand, the current bottleneck is not eliminated even when the host (device file 13) is changed (S77: NO), a simulation must be performed for another movement-destination-candidate host. Furthermore, a simulation must also be performed for another movement-destination-candidate host in cases where another new bottleneck is produced (S78: YES) when the host is changed.

Therefore, the management server 50 judges whether all the movement-destination-candidate hosts have been simulated (S80). When unreviewed movement-destination-candidate hosts exist (S80: NO), the management server 50 switches the simulation target host (S81), returns to S73, and repeats the above processing. When, as a result of performing a simulation for all the movement-destination-candidate hosts, a suitable host has not been detected (S80: YES), the management server 50 returns to the processing shown in FIG. 13.

Figure 16:
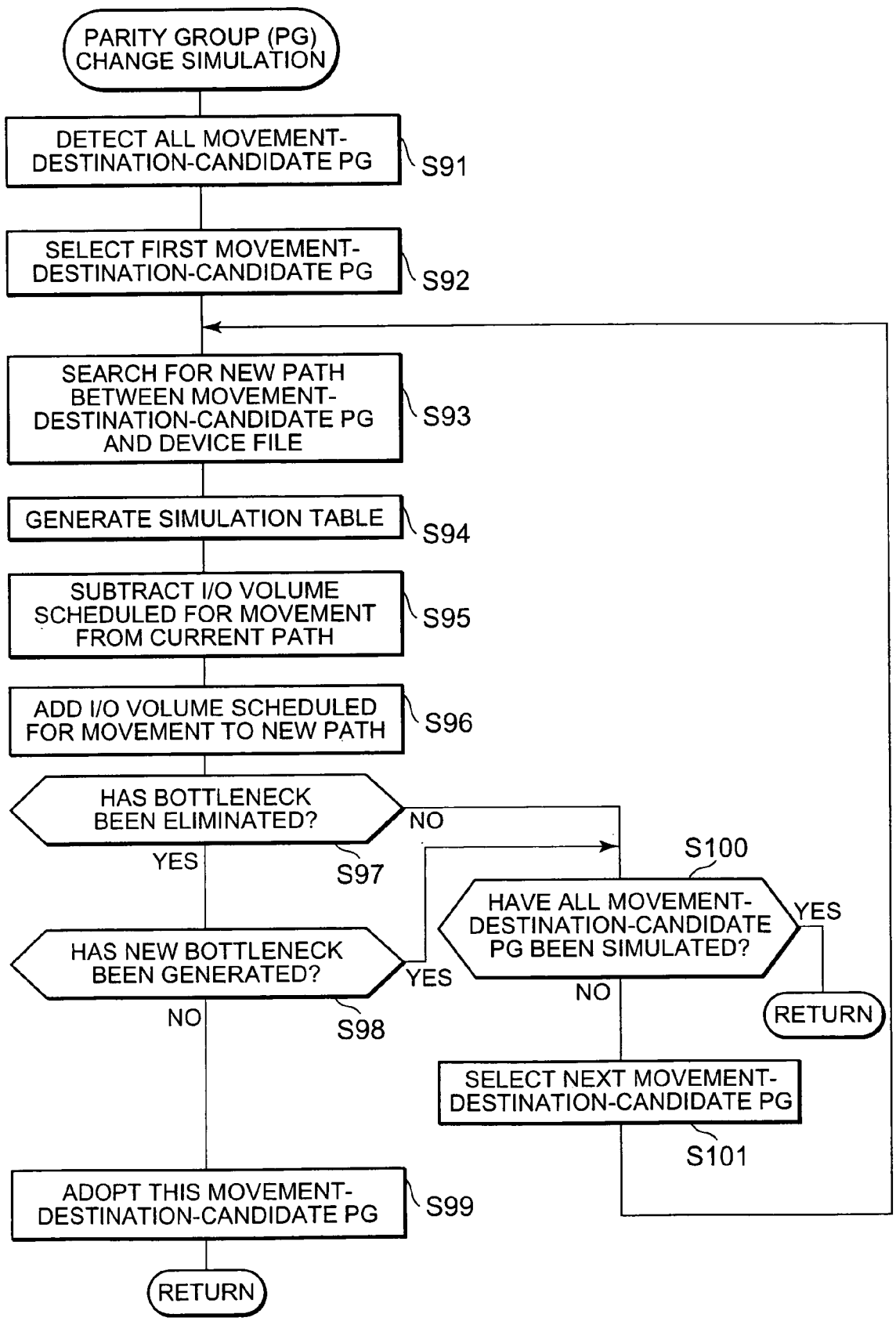
FIG. 16 is a flowchart showing simulation processing for a parity group change measure.

FIG. 16 is a flowchart showing simulation processing for the 'parity group change' measure. In this figure, parity group appears as 'PG'. In this embodiment example, the 'parity group change' priority level is set as the lowest priority level. Therefore, in cases where a bottleneck elimination method has not been found by means of the 'LDEV change' measure, 'host change' measure, or the like, the efficacy of the 'parity group change' measure is then reviewed.

The simulation processing of the 'parity group change' measure has the same basic structure as the simulation processing of the 'LDEV change' measure shown in FIG. 14. The difference is that the simulation target is changed from 'LDEV 23' to 'parity group 22'.

First, the management server 50 detects all of the movement-destination-candidate parity groups 22 (S91) and selects the first movement-destination-candidate parity group 22 (S92). The management server 50 detects the new path between the large source device file 13 generating the I/O constituting the origin of the bottleneck and the movement-destination-candidate parity group 22 (S93).

The management server 50 creates a simulation table by copying each of the information items T2 to T5 (S94). As per the above-mentioned processing, the management server 50 subtracts the I/O volume scheduled for movement from the latest I/O volume of each element located on the current path (S95). The management server 50 then adds the I/O volume scheduled for movement to the latest I/O volume of each element located on the new path (S96).

The management server 50 judges whether the bottleneck occurring at present is eliminated after the I/O volume associated with the large source device file 13 has been moved (S97). Thereafter, the management server 50 judges whether a new bottleneck has occurred in each element on the new path (S98).

When the current bottleneck has been eliminated (S97: YES) and a new bottleneck has not occurred (S98: NO), the management server 50 judges the movement-destination-candidate parity group 22 to be a suitable parity group 22 for the movement destination and selects this parity group 22 (S99).

In cases where the current bottleneck is not eliminated (S97: NO) or a new bottleneck is produced (S98: YES), the management server 50 repeats the processing of S93 to S98 until all the unreviewed movement-destination-candidate parity groups 22 are reviewed (S100, S101).

FIG. 17 is an explanatory view showing part of a simulation method that employs a simulation table. A description will be provided by taking the 'LDEV change' measure simulation processing in FIG. 17 as an example. The description will be provided while also making suitable references to FIG. 7.

FIG. 17(a) shows an aspect in which the I/O volume associated with the large source device file 13 is subtracted. Supposing that, here, the device file (/dev/dsk/xxx) generates the I/O, which is the main cause of a bottleneck. As shown in FIG. 7, the large size device file (/dev/dsk/xxx) generates an I/O of 6000 bytes per second with respect to LDEV (0:10) at time 10:10.

As shown in FIG. 17(a), when a change to the LDEV (0:10) is reviewed, the management server 50 subtracts the I/O volume (6000 bytes per second) generated by the large source device file from the movement source LDEV (0:10). Therefore, the I/O volume of the movement source LDEV (0:10) is '0'.

Suppose that the movement-destination-candidate LDEV is LDEV (0:20). As shown in FIG. 17(b), the management server 50 adds the I/O volume scheduled for movement (6000 bytes per second) to the latest I/O volume (1000 bytes per second) of the movement-destination-candidate LDEV (0:20). The expected I/O volume of the movement-destination-candidate LDEV (0:20) is therefore then 7000 bytes per second. In cases where the expected I/O volume does not exceed the threshold value set for the movement-destination-candidate LDEV (0:20), the change from the LDEV (0:10) to the LDEV (0:20) is granted. When the expected I/O volume exceeds the LDEV (0:20) threshold value, the LDEV change is not granted.

This embodiment example is constituted as detailed above and therefore affords the following effects. This embodiment example is constituted to allow bottlenecks to be detected by monitoring the performance states of each of the elements constituting the storage system and to allow a measure for eliminating the bottleneck to be found. Therefore, a suitable measure can be developed by considering the status of the whole storage system.

This embodiment example is constituted to eliminate bottlenecks by changing each of the elements located at the two ends of the information processing path (the device file 13, LDEV 23, and parity group 22) to other elements. That is, the constitution is such that, even when a bottleneck occurs midway along the information processing path, the constitution of the intermediate parts on the path is not directly changed, the bottleneck being eliminated by changing the constitution of the two ends of the path. The bottleneck can therefore be eliminated by means of a relatively simple operation.

The embodiment example is constituted to detect a bottleneck (the probability of a bottleneck) and simulate a measure for eliminating the bottleneck before changing the constitution of the storage system. Hence, before actually adding disks or replacing storage devices, and so forth, the effect that such a change to the constitution would exert on the elimination of the bottleneck can be evaluated beforehand. That is, disks scheduled to be newly added and new elements (device files, LDEV, storage ports, switch ports, parity groups, and so forth) for storage devices are virtually registered in each of the simulation tables, whereby the effects of performance improvement can be evaluated without actually performing any addition or replacement.

Further, the present invention is not limited to the above embodiments. A person skilled in the art is able to make a variety of additions, modifications, and so forth within the scope of the present invention. For example, respective embodiment examples can be suitably combined.

For example, the constitution may be such that each of the individual elements constituting the storage system is not monitored, the respective elements instead being classified into types and grouped, and then monitored in group units. That is, the respective elements in the server and the respective elements in the storage device are not monitored individually. The performance state of a whole server, the performance state of a whole switch group (fabric) and the performance state of a whole storage device, for example, can instead be detected as summary data. For example, server summary data (I/O volume per unit of time of the whole server can be found as the sum total of the respective device-file I/O volumes. Therefore, the status of the whole storage system can be grasped more quickly and in a broader aspect by performing management in group units.

What is claimed is:

1. A storage system comprising a storage device with a plurality of logical volumes, a host computer that is connected to the storage device and that has an access processing unit for accessing each of the logical volumes, and a management computer connected to the storage device and the host computer, the management computer comprising:

a performance information collection unit for collecting performance information on the performance of respective elements on a communication path between the host computer and the storage device, the respective elements including a storage unit separate from the storage device, the storage unit being on the communication path;

a faulty element detection unit for detecting a faulty element with an obstacle hindering performance improvement on the basis of the collected performance information on the respective elements; and a reviewing unit for reviewing measures based on a nature of the obstacle of the faulty element thus detected and selecting a measure that is effective against the obstacle, the measure being selected based on simulations performed by changing an I/O amount of each of the elements, the I/O amount being a result of the measure of a data usage element associated with the storage unit;

wherein measures reviewed by the reviewing unit change at least one of the logical volumes or the access processing unit associated with the faulty element to another logical volume or another access processing unit.

2. The storage system according to claim 1, further comprising: a presentation unit for presenting the measure selected by the reviewing unit to a user.

3. The storage system according to claim 1, wherein the reviewing unit selects a measure that is effective against the obstacle by evaluating the efficacy against the obstacle of all or some of a plurality of pre-prepared measures.

4. The storage system according to claim 1, wherein a storage unit for pre-storing a plurality of measures each with a different priority level is provided; and wherein in order of priority starting with the measure with the highest priority among the plurality of measures, the reviewing unit evaluates the efficacy of the measures against the obstacle, and selects a measure that is effective against the obstacle when such a measure is found.

5. The storage system according to claim 1, wherein a plurality of measures each with a different priority level is associated beforehand with a range of elements affected by each of the measures, and wherein in order of priority starting with the measure with the highest priority level among the plurality of measures, the reviewing unit evaluates the efficacy of the measures against the obstacle within the range of the elements pre-associated with the measures and selects a measure that is effective against the obstacle when such a measure is found.

6. The storage system according to claim 1, wherein the respective elements on the communication path include the logical volumes, the access processing unit, and a relay device for relaying data between the storage device and the host computer.

7. A storage system comprising a storage device with a plurality of logical volumes, a host computer that is connected to the storage device and that has an access processing unit for accessing each of the logical volumes, and a management computer connected to the storage device and the host computer, the management computer comprising:

a performance information collection unit for collecting performance information on the performance of respective elements on a communication path between logical volumes used on the host computer and logical volumes managed on the storage device;

a faulty element detection unit for detecting a faulty element with an obstacle hindering performance improvement on the basis of the collected performance information on the respective elements; and a reviewing unit for reviewing measures based on a nature of the obstacle of the faulty element thus detected and selecting a measure that is effective against the obstacle, the measure being selected based on simulations performed by changing an I/O amount of each of the elements, wherein measures reviewed by the reviewing unit change at least one of the logical volumes or the access processing unit associated with the faulty element to another logical volume or another access processing unit; and the respective elements comprise at least a storage unit separate from the storage device, the respective elements being on the communication path between the host computer and the storage device;

the I/O amount being one of results of the measure of a data usage element associated with the storage unit;

the at least one of the logical volumes being an element on the data communication path.

8. The storage system of claim 1 wherein the storage system comprises a storage area network, the storage area network being in compliance with a fiber channel protocol.

* * * * *